Aug. 4, 1925.

J. S. ALSPAUGH 1,548,428

AUTOMATIC GEAR SHIFT CONTROL MECHANISM

Filed July 29, 1920 4 Sheets-Sheet 2

Inventor
James S. Alspaugh
By
his Attorneys

Aug. 4, 1925.  1,548,428
J. S. ALSPAUGH
AUTOMATIC GEAR SHIFT CONTROL MECHANISM
Filed July 29, 1920 4 Sheets-Sheet 3

Inventor
James S. Alspaugh
his Attorneys

Aug. 4, 1925.

J. S. ALSPAUGH 1,548,428

AUTOMATIC GEAR SHIFT CONTROL MECHANISM

Filed July 29, 1920     4 Sheets-Sheet 4

Inventor
James S. Alspaugh
By Fincel Fincel
his Attorneys

Patented Aug. 4, 1925.

1,548,428

UNITED STATES PATENT OFFICE.

JAMES S. ALSPAUGH, OF PORTSMOUTH, OHIO.

AUTOMATIC GEAR-SHIFT-CONTROL MECHANISM.

Application filed July 29, 1920. Serial No. 399,837.

*To all whom it may concern:*

Be it known that I, JAMES S. ALSPAUGH, a citizen of the United States, residing at Portsmouth, in the county of Scioto and State of Ohio, have invented a certain new and useful Improvement in Automatic Gear-Shift-Control Mechanisms, of which the following is a specification.

The present invention relates to mechanism like that shown in the patent issued to me February 19, 1918, No. 1,257,064, and in my patent dated April 25, 1922, No. 1,413,561.

The object of the present invention, generally, is to provide a simplified construction in which is avoided the necessity for added hand-setting mechanism to determine which of the gear shift rods is to be operated and in which the operation of the gear shift mechanism is performed and controlled wholly by the foot and the motion and absence of motion of the vehicle.

My invention, as herein exemplified, is more especially applicable to motor vehicles having a clutch and gear shift mechanism such as used, for example, in the "Cadillac" car. In referring to the various positions of the rods and speeds obtained with such a gear shift mechanism I shall denominate them as low, intermediate and high and reverse. In such mechanism the propeller shaft either drives the vehicle, or the motion of the vehicle, as in coasting down hill, drives the propeller shaft.

In the present instance I utilize the motion of the propeller shaft to lock the low and reverse gear shift rod and unlock the intermediate and high speed rod, so that when the vehicle is at rest the low and reverse gear shift rod are free to be operated; but when the car is in forward motion the intermediate and high gear shift rod are free to be operated.

In the accompanying drawings forming part hereof—

Figure 6:
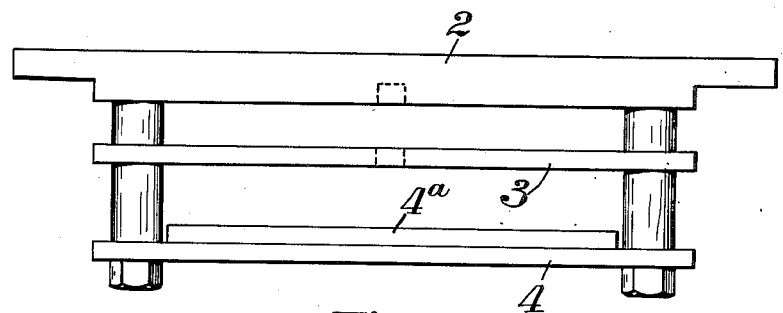
Fig. 6 is a detail view of the frame that carries the slide and its appurtenances.
Figure 7:
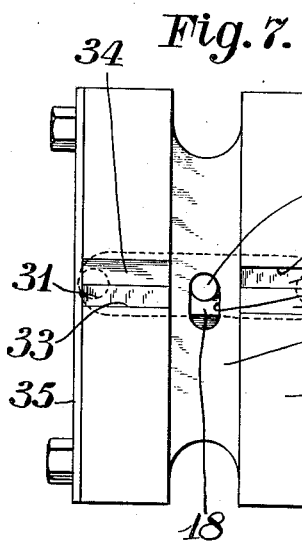
Figs. 7, 8 and 9 are top, edge and bottom plan views respectively of the slide and its appurtenances.
Figure 8:
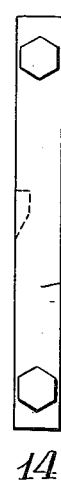
Figure 9:
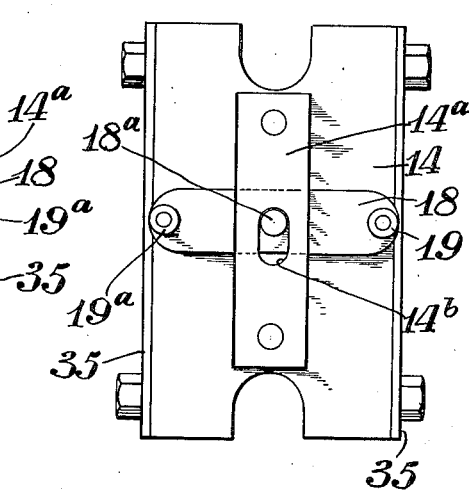

The construction, as shown, includes an oblong box-like frame 1, in which extend longitudinally the usual gear shift rods 8 and 9 except that each rod is provided in its upper face with a transverse groove as shown at 20 and 21 respectively. The rod 9 actuates the speed changing gear to secure low and reverse and the rod 8 the intermediate and high. The rod 9 at its rear end is cut away to form an elongated flat surface 9ª and a shoulder 9° for the purpose hereinafter explained. Supported longitudinally in the box 1 by means of screws 1ª is a frame shown in Fig. 6 comprising parallel bars 2, 3 and 4 bolted together in spaced relation by suitable spacers. The bar 4 is composed of two parts, the upper one of which 4ª is removable and serves as a filler for convenience in assembling. Placed and sliding longitudinally between the bars 3 and 4 and guided by the bar 3 is a plate 14. Said plate 14 has in its upper face cross grooves 31 and 32 with their bottoms in line with each other, one wall 33 of each groove being vertical to form an abutment while the other wall 34 is slanting as shown. The grooves lie in reverse position with reference to each other. The opposite longitudinal edges of the slide have secured to them strips 35 that close the outer end of the grooves and form a rectangular corner at each of said outer ends. Pivoted above the slide 14 and the bar 3 is an oscillating lever or member 10 carrying at each of its ends hollow studs 39 and each of said studs contains a latch pin 37 pressed down by a spring 40 to enter the groove 31 or 32 or bear upon the upper face of the slide 14 according to the position of the members. The oscillating member 10 is fulcrumed in the bar 2 by means of a pin $10^a$ entering parallel cross slots $10^b$ in the bars 2 and 3 so that the axis of motion of said member 10 is shiftable laterally.

The oscillating member 10 is actuated by a forked block 12 on a shiftable rod 5 extending longitudinally through the frame 1. The forked block 12 embraces the left hand hollow stud 39 (Fig. 1) and is held yieldingly in position on the rod 5 between a coil spring 6 encircling the rod within the frame and a pin 7 in said rod 5. The rod 5 is operated in the rearward direction by a foot pressure on the usual motor vehicle clutch lever (not herein shown) connected thereto through a rod 41 and a lever 42 fulcrumed on a fixed bracket $42^a$. In the present construction therefore the operation of the clutch lever in the forward direction draws the block 12 rearward and the spring 6 aids in pressing said block 12 forward when the clutch lever is thrown rearward. When the member 10 is sufficiently oscillated in one direction by the operation of the block 12 one of the latch pins 37 is projected into its groove 31 or 32 and upon oscillation in one opposite direction said pin engages the abutment wall of said groove and carries the slide in the corresponding direction. When either latch pin of the member 10 is engaged with the slide to move the latter the movement is limited by the engagement of the pin with the right angled corner of the groove formed by the strip 35. After such a movement and under the action of the spring 6 the opposite pin rides up the beveled wall of its groove and onto the face of slide 14. The cross slots $10^b$ permit endwise movement of the member 10 when the latch pin is confined and swung by the abutment wall of a groove 31—32. The slide 14 as will be hereinafter further explained can be given a full stroke for operating one of the rods 8 and 9, or it can be given a limited movement in either direction to place the slide in position for full actuation in the desired direction.

The slide 14 has affixed to its lower side and spaced from it a longitudinally extending bar $14^a$ on which is carried a floating lever member 18 having at its opposite ends pins 19 and $19^a$ that enter the grooves 20 and 21 of the gear shift rods 8 and 9.

The member 18 is provided with a pin $18^a$ entering a longitudinal slot $14^b$ in the bar $14^a$, said slot being of sufficient length to permit the limited movement of the slide 14 to present the selected abutment 33 as heretofore referred to without operating the floating lever 18. From the foregoing it will be observed that either of the gear shift rods can be held from movement while the other rod is left free to be moved, such movement being effected by the slide 14 when moved sufficiently to actuate floating lever 18.

The means for locking the rods 8 and 9 includes bolts 27 and 28 having tapering ends entering notches $8^b$ and $9^b$ in said rods when they are in neutral position. These bolts 27 and 28 are normally pressed toward the rods by suitable springs as shown but so that unless the bolt is locked its rod can be moved longitudinally notwithstanding the latching engagement of the bolt. The upper ends of the bolts are provided with notches $27^a$ and $28^a$ facing each other. In the wall of the frame between these notches is a lock piece 29 adapted to be slid into engagement with either of said notches so that when one bolt is fully locked the other is unlocked. Said lock piece is of such length that it is prevented from operation when one of the bolts is raised. Said lock piece 29 has connected with it a rod 50 of a piston 51 in a cylinder 52 which receives pressure of oil through a pipe 53 from a suitable pump 54 geared to be operated by the propeller shaft 55 of the vehicle. The arrangement is such that the lock piece 29 is moved by the operation of the propeller shaft to lock the "low and reverse" rod 9, a spring 56 in the cylinder moving said lock piece in the opposite direction to disengage the same from bolt 28 and lock the "intermediate and high" rod 8 when the propeller shaft is not rotated and the oil pressure released. The rod 9 has another lock consisting of a hollow piston 57 in a cylinder 58 supplied by pressure through a branch pipe 59 simultaneously with the supply of pressure to the cylinder 52, said hollow piston 57, when actuated by oil pressure, is forced against the flat or cut away portion $9^a$ of the rod 9, the abutment of which acts as a stop to prevent the rearward movement of said rod; in other words to prevent the operation of the gear shift into "reverse." While the car is in motion therefore the rod 9 cannot be moved either rearward into reverse or forward into "low." A pin 60 having a tapered end backed by a spring 61 in the cylinder 58 serves by pressure against the rod 9 to dislodge the piston 57 from its locking position when motion of the vehicle and pressure behind the piston has ceased. The tapered end of the pin 60 permits the rod 9 to pass it when drawn rearward to put the gear in reverse. It will be seen therefore that with the rod-locking arrangement and while the car is standing still the rod 9 can be moved from neutral forward to secure low speed forward or into "reverse." Upon shifting to second or intermediate speed while the car is in motion the rod 9 is automatically restored to and locked in neutral by the piston 57 and lock piece 29 thereby releasing the rod 8 for movement.

The member 18 serves as a lever of the second class fulcrumed in the locked gear shift rod and actuated by the slide to move the other, or unlocked rod in either direction.

Figure 1:
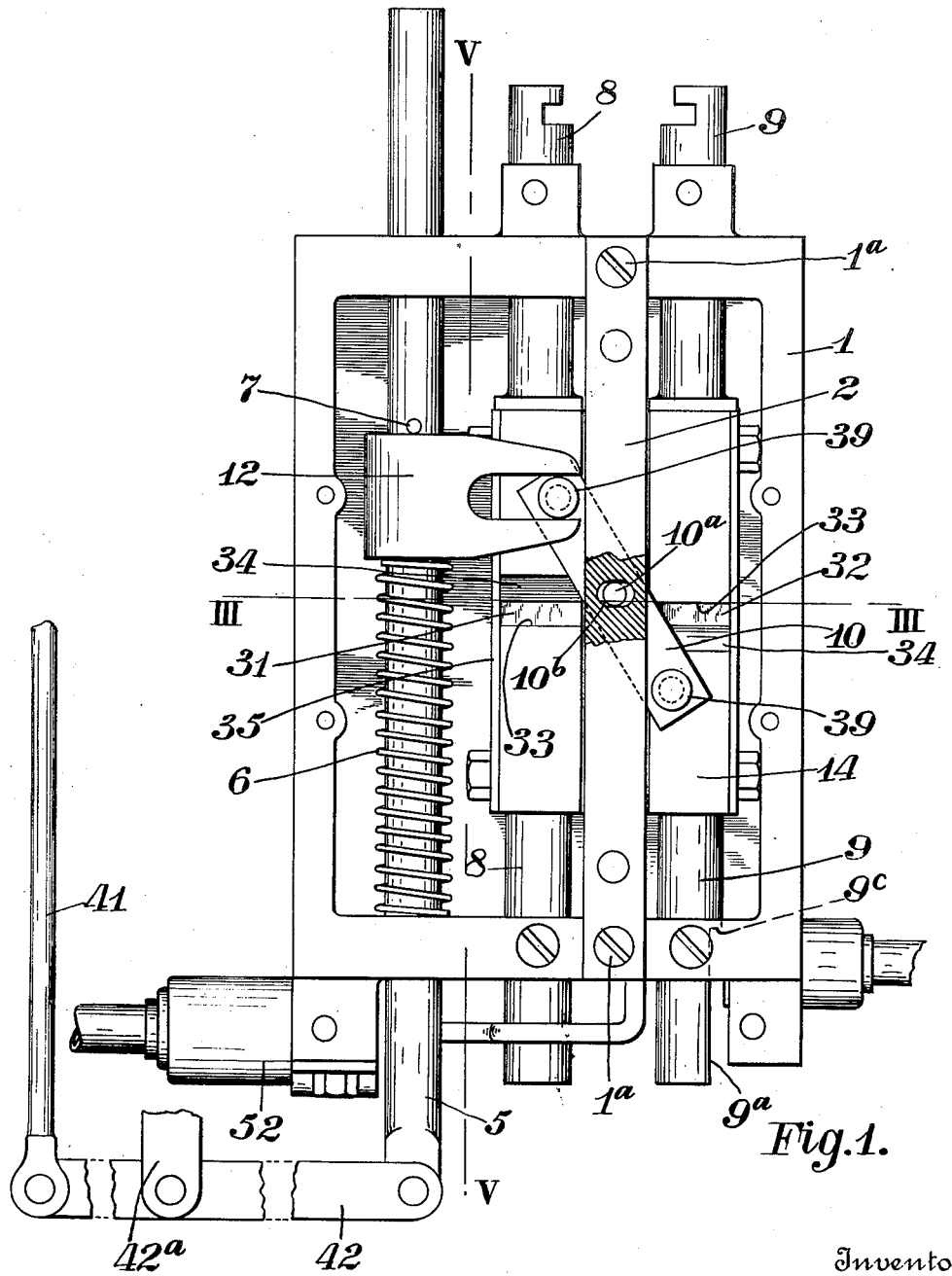
Figure 1 is a top plan view of the mechanism with the cover of the box-like frame removed and with a small part in section.
Figure 2:
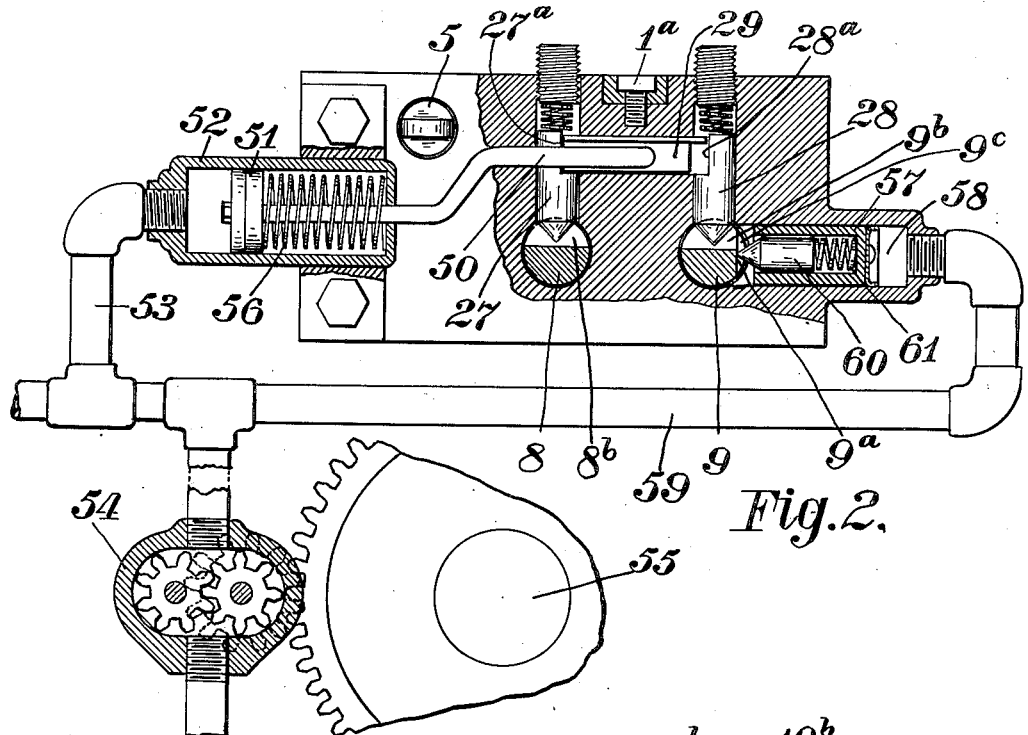
Fig. 2 is an elevation of the rear end of the box, the wall and other parts being in section to illustrate the locking mechanism.
Figure 3:
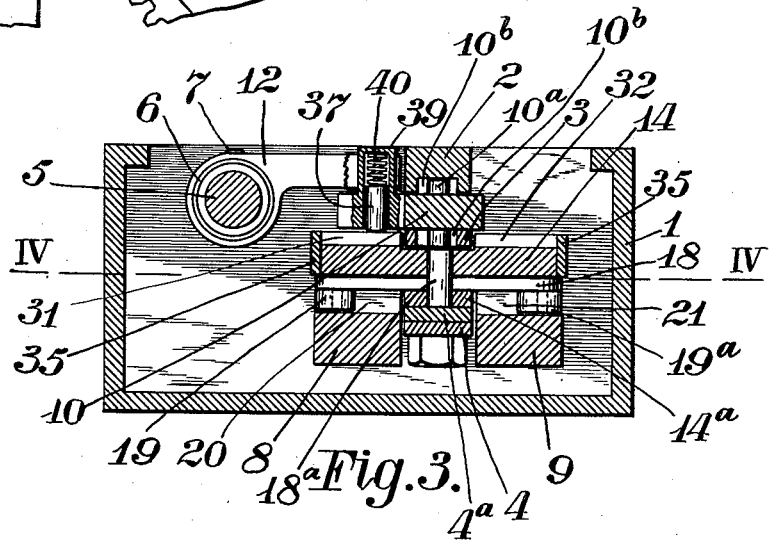
Fig. 3 is a cross section mainly on the line III—III Fig. 1 and with a further section forward to show details of the slide actuating means.
Figures 4, 5:
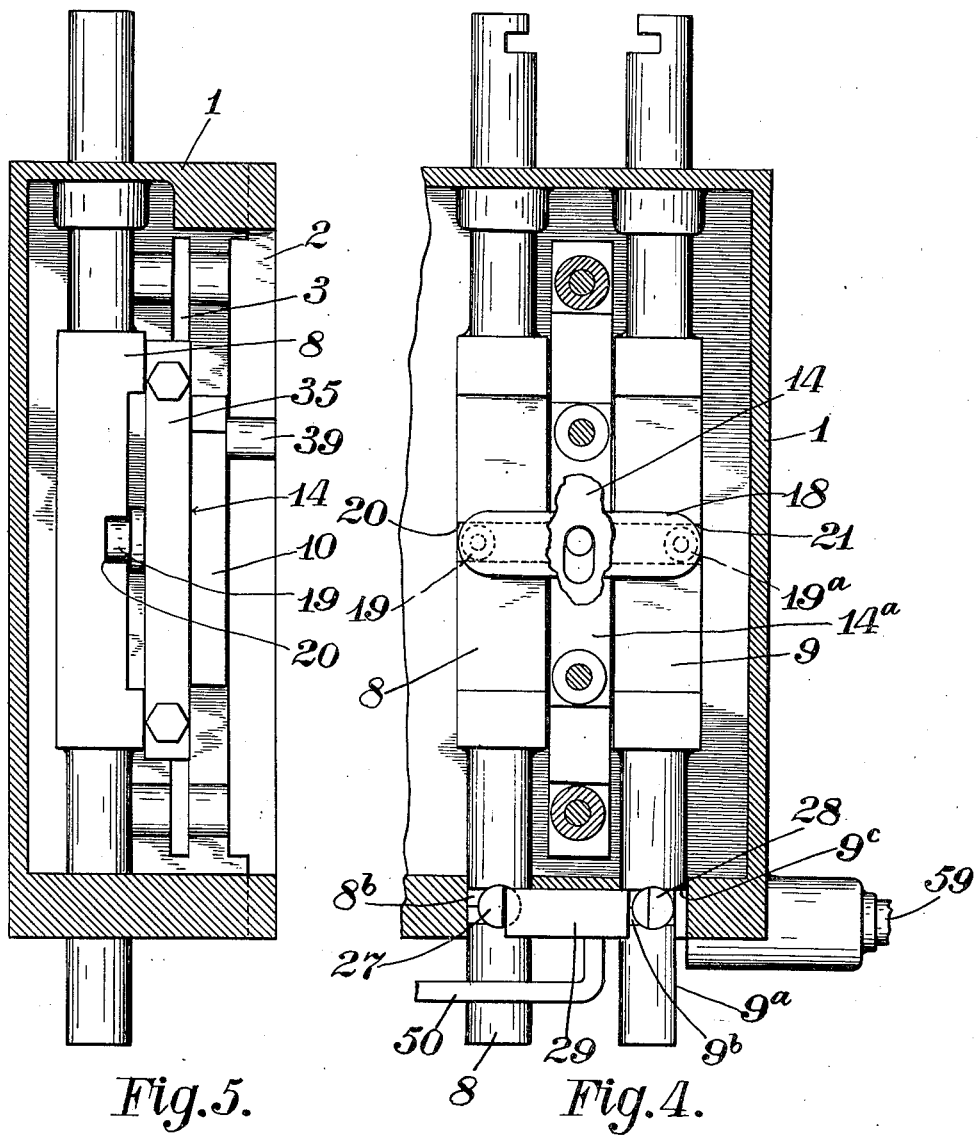
Fig. 4 is a horizontal section on line IV—IV Fig. 3 with a fraction of the slide.
Fig. 5 is a vertical section on line V—V Fig. 1 looking to the right.

The cycle of operations may be described as follows:

Figs. 1 and 2 show the parts in neutral position. In this position the vehicle is ordinarily at rest with no fluid pressure in the cylinders 52 and 58. Complete oscillation of the member 10 by forward pressure on the clutch lever will cause the rod 5 to move rearward and the right hand latch of said member 10 to engage the square or abutment wall 33 of the right hand groove 32 and thus move slide 14 and rod 9 forward into low. This effect takes place because the rod 9 is not locked by piston 57 when the vehicle is at rest and rod 8 is locked by lock piece 29 thereby affording a fulcrum in said rod 8 for the floating lever 18 which is carried forward by the end of the slot 14$^b$ with the slide 14. When the rod 9 is shoved into "low" position the propeller shaft is rotated and oil pressure tends to press the lock piece toward bolt 28 but before that time said bolt is elevated out of its ntoch 9$^b$ so as to prevent locking engagement therewith of lock piece 29. Simultaneously pressure on the piston 57 is also exerted but such pressure is ineffectual to lock the rod 9 in the forward stroke because of the cut-away portion at the rear end of that member. When the slide 14 is at its forward position as just described the member 10 returns to position shown in Fig. 1 without operating slide 14 by reason of the rearward movement of the clutch lever aided by the spring 6. When the slide 14 is in neutral poistion, as shown in Fig. 1 and the left hand end of the member 10 is drawn rearward in first forward movement of the slide, the latch member at that end passes over the upper edge of the left hand strip 35 without entering the left hand groove 31 and engaging the square abutment thereof because the right hand groove is nearer the right hand pin 39 than the left hand groove to the left hand pin 39 the slot containing pin 10$^a$ permitted endwise movement of the member 10 caused by the engagement of the right hand latch with the square corner of the right hand groove 32 formed by the abutment 33 and strip 35. When the slide 14 is thus shoved forward to put the rod 9 into low it remains there until again actuated by the member 10 which is restored to position shown in Fig. 1 by spring 6 upon the next stroke forward of the clutch lever. On the next forward stroke of the clutch lever the left hand latch pin 39 engages with the left hand abutment 33 of the left hand groove 31 because the forward position of the slide 14 placed the square corner of the left hand groove 31 nearer the left hand pin 39 and within the arc or movement of that pin. This second or rearward stroke of the slide 14 is proportioned to the stroke of the clutch lever and can be made either to the middle or neutral position or it can be a full stroke as desired. If the stroke be only to neutral the slide is left in the position shown Fig. 1 and the member 10 returned to the position shown by the spring 6 and clutch lever as before. The endwise movement of the member 10 to the right takes place in this second stroke and the right hand latch pin swings over the edge of the right hand strip 35 in the same manner as described in making the forward stroke of the slide. But if said second stroke be a full stroke carrying the slide 14 to its extreme rearward position the rod 8 is drawn rearward into second or intermediate speed position because when the slide arrives at neutral position the bolt 28 slips into notch 9$^b$ of the rod 9 and the lock piece 29 slips away from bolt 27 into bolt 28 (because of pressure in 52) thereby liberating rod 8, and locking rod 9 and thus permitting the floating lever 18 to carry the rod 8 rearward to said second or intermediate speed position. After this full stroke of the slide rearward it is left in rearward position the member 10 being returned to the normal position shown in Fig. 1 preparatory to the third stroke forward of the clutch lever and second forward stroke movement of the slide. Because the abutment and square corner of the right hand groove 32 is brought within the arc of movement of the right hand latch of the member 10 when the slide is in its rearward position, as last described, said slide can be shoved forward past neutral position to extreme forward position again thereby carrying the rod 8 to high speed position. This effect takes place because the rod 9 is still locked (the car being in motion) and permitting the floating lever 18 fulcrumed by pin 19$^a$ in said locked rod 9 to carry the rod 8 forward. While the car is in motion the rod 8 can be shifted back and forth at will between the intermediate and high speed position care being taken to suitably "slow" the car when shifting from high to intermediate and second speed and speeding up the car from intermediate to high. From either the low, high or intermediate positions the slide and rod 8 can be shifted to neutral and the car brought to rest. When thus brought to rest the pressure in cylinders 52 and 58 is released and the locking piece 29 restored to position to lock bolt 27 and rod 8.

To cause a backing movement of the vehicle the rod 9 must be shifted rearward. This is accomplished by first shifting, if necessary, the slide 14 forward a partial stroke of the slide permitted by slot 14$^b$ sufficiently to shift the member 10 endwise to the right to bring the abutment of the left hand groove 31 within range of the arc of movement of the left hand latch pin for a full stroke of the slide rearward, the same as in throwing the rod 8 into high. Upon this full stroke of the slide 14 rearward the rod 9 is shifted rearward into "reverse" position, the rod 8 (being normally locked by piece 29) affording a fulcrum for the floating lever 18. The rod 9 can go to "reverse" position under this actuation because the shoulder at 9$^a$ is unobstructed by lock piston 57 (see Fig. 1) the car being at rest. Rearward motion of the car does not create locking pressure in cylinders 52 and 58.

It will be observed that whenever the vehicle is to be brought to rest whether the gear shift rod be in high, intermediate, low or reverse the gear shift rod giving motion must be brought to neutral. Moreover, it will be seen that the vehicle must be brought to rest if the gearing is to be changed from any of its other positions to reverse or from reverse to any of the other positions. The slide may be moved in the same direction to go from high to reverse, the vehicle, however, being stopped to permit the release of the lock 57. In these respects, therefore, the operations are the same as if operated by the hand lever now in common use with the sort of speed changing gear referred to.

The forms of the parts can be changed without departing from the gist of the invention as claimed.

What I claim is:

1. In combination with the two rods of the speed changing gear of a motor vehicle, means for automatically locking from movement in one direction one of said rods by the motion of the vehicle and releasing the other, and means for shifting either rod when released.

2. In combination with the two rods of the speed changing gear of a motor vehicle, means for automatically locking from movement in one direction one of said rods by the motion of the vehicle and releasing the other, and means for shifting either rod when released consisting of a selective mechanism and a lever actuated thereby to fulcrum in the locked rod while moving the other.

3. In a gear shifting mechanism, the combination, with two gear shifting rods, means common to the two rods for latching either of them in neutral position and releasing the other, a lever engaged with both of said rods and means for actuating said lever to shift the released rod.

4. In a motor vehicle the combination of a speed changing gear mechanism including two gear-shifting rods movable in either direction from a neutral position, means driven when the car is in motion whereby one of said rods is locked and the other released, means for actuating the released rod from neutral position in either direction and means for preventing the actuation of the other rod in one direction from neutral position when the vehicle is in motion.

5. In a motor vehicle the combination of a speed changing gear mechanism including an intermediate and high gear-shifting rod and a low and reverse gear-shifting rod each movable in either direction from neutral position, means driven when the car is in motion whereby the intermediate and high rod is locked when the low and reverse rod is operated and for locking the low and reverse rod when high and intermedate rod is operated and means preventing the actuation of the low and reverse rod directly from low position to reverse position while the car is in motion.

6. In a motor vehicle the combination of a speed changing gear mechanism including an intermediate and high gear-shifting rod and a low and reverse gear-shifting rod each movable in either direction from neutral position, means driven when the car is in motion whereby the intermediate and high rod is locked when the low and reverse rod is operated and for locking the low and reverse rod when the high and intermediate rod is operated and means preventing the actuation of the low and reverse rod directly from low position to reverse position while the car is in motion, the means for actuating either rod when released consisting of a lever fulcrumed in the locked rod and means for actuating said lever.

7. In a motor vehicle, the combination of a speed changing gear mechanism including two gear shifting rods, means driven when the vehicle is in forward motion for locking one of said rods and releasing the other and means for actuating the released rod.

8. In a motor vehicle, the combination of a speed changing gear mechanism including two gear shifting rods, means driven when the vehicle is in forward motion for locking one of said rods and releasing the other and means for actuating the released rod consisting of a lever fulcrumed in the locked rod and means for actuating said lever.

9. In a motor vehicle, the combination with a pair of gear shift rods, means actuated with the motion of the vehicle for locking one rod and releasing the other, a floating lever engaging said rods, a reciprocating slide actuating said lever, and means connected with the clutch lever of the vehicle for selectively actuating said slide.

10. The combination with a pair of reciprocated gear shift rods, a lock for locking one of said rods and releasing the other and means for moving the same, a lever engaged with both of said rods, a reciprocable member for actuating said lever to move the released rod, oscillating means for selectively positioning said reciprocating member and means for actuating said oscillating means.

JAMES S. ALSPAUGH.